(12) United States Patent
Köppel et al.

(10) Patent No.: US 11,572,980 B2
(45) Date of Patent: Feb. 7, 2023

(54) LUBRICANT DISTRIBUTOR, ESPECIALLY SECTIONAL DISTRIBUTOR

(71) Applicant: Baier & Köppel GmbH & Co. KG, Pegnitz (DE)

(72) Inventors: Bernhard Köppel, Pegnitz (DE); Alexander Löckert, Auerbach (DE)

(73) Assignee: GROENEVELD-BEKA GMBH, Pengnitz (DE)

( * ) Notice: Subject to any disclaimer, the term of this patent is extended or adjusted under 35 U.S.C. 154(b) by 698 days.

(21) Appl. No.: 16/446,115

(22) Filed: Jun. 19, 2019

(65) Prior Publication Data

US 2020/0003363 A1  Jan. 2, 2020

(30) Foreign Application Priority Data

Jun. 29, 2018  (DE) ...................... 10 2018 115 873.4

(51) Int. Cl.
| | | |
|---|---|---|
| *F16N 25/04* | (2006.01) | |
| *F16K 11/16* | (2006.01) | |
| *F16K 31/04* | (2006.01) | |
| *F16K 31/53* | (2006.01) | |
| *F16N 7/38* | (2006.01) | |

(52) U.S. Cl.
CPC ............ *F16N 25/04* (2013.01); *F16K 11/166* (2013.01); *F16K 31/043* (2013.01); *F16K 31/535* (2013.01); *F16N 7/385* (2013.01); *F16N 2250/40* (2013.01); *F16N 2280/04* (2013.01)

(58) Field of Classification Search
CPC ................................ F16N 25/04; F16K 11/166
See application file for complete search history.

(56) References Cited

U.S. PATENT DOCUMENTS

| | | | | |
|---|---|---|---|---|
| 1,951,771 | A * | 3/1934 | Reswick ................ | F16N 25/04 184/7.4 |
| 5,333,640 | A * | 8/1994 | Swift ...................... | F16N 7/32 137/262 |
| 8,480,532 | B2 * | 7/2013 | Biermann .............. | F16H 48/11 475/252 |

(Continued)

FOREIGN PATENT DOCUMENTS

| | | | |
|---|---|---|---|
| DE | 20217308 U1 | 4/2003 | |
| DE | 202007016788 U1 * | 2/2008 | ............ F16N 25/00 |

(Continued)

*Primary Examiner* — Michael A Riegelman
(74) *Attorney, Agent, or Firm* — The Webb Law Firm

(57) ABSTRACT

A sectional lubricant distributor for distributing lubricant to at least one lubrication point, including a distributor body having an inlet opening for lubricant which is fluidically connected to at least one outlet passage, which opens into an outlet opening of the distributor body, a rotary valve is rotatably mounted in the distributor body and is adjustable between an open position of the rotary valve, in which the outlet passage is open in order to allow lubricant to pass through to the outlet opening, and a closed position of the rotary valve, in which the outlet passage is closed, an electromotive drive which is coupled to a control gear, including a control gearwheel having a control toothing section engageable with a toothing of the rotary valve to move the rotary valve between the open position and the closed position. Further, a method for distributing lubricant to at least one lubrication point.

23 Claims, 5 Drawing Sheets

(56) References Cited

U.S. PATENT DOCUMENTS

| | | | | |
|---|---|---|---|---|
| 9,017,205 B2* | 4/2015 | Steinwender | ............. | F04C 2/14 |
| | | | | 475/98 |
| 9,140,407 B2* | 9/2015 | Conley | ..................... | F16N 7/14 |
| 2004/0129500 A1* | 7/2004 | Weigand | ................. | F16N 25/04 |
| | | | | 184/105.1 |

FOREIGN PATENT DOCUMENTS

| | | |
|---|---|---|
| DE | 202007016788 U1 | 3/2008 |
| EP | 3272591 A1 | 1/2018 |
| GB | 191218280 A1 | 5/1913 |

* cited by examiner

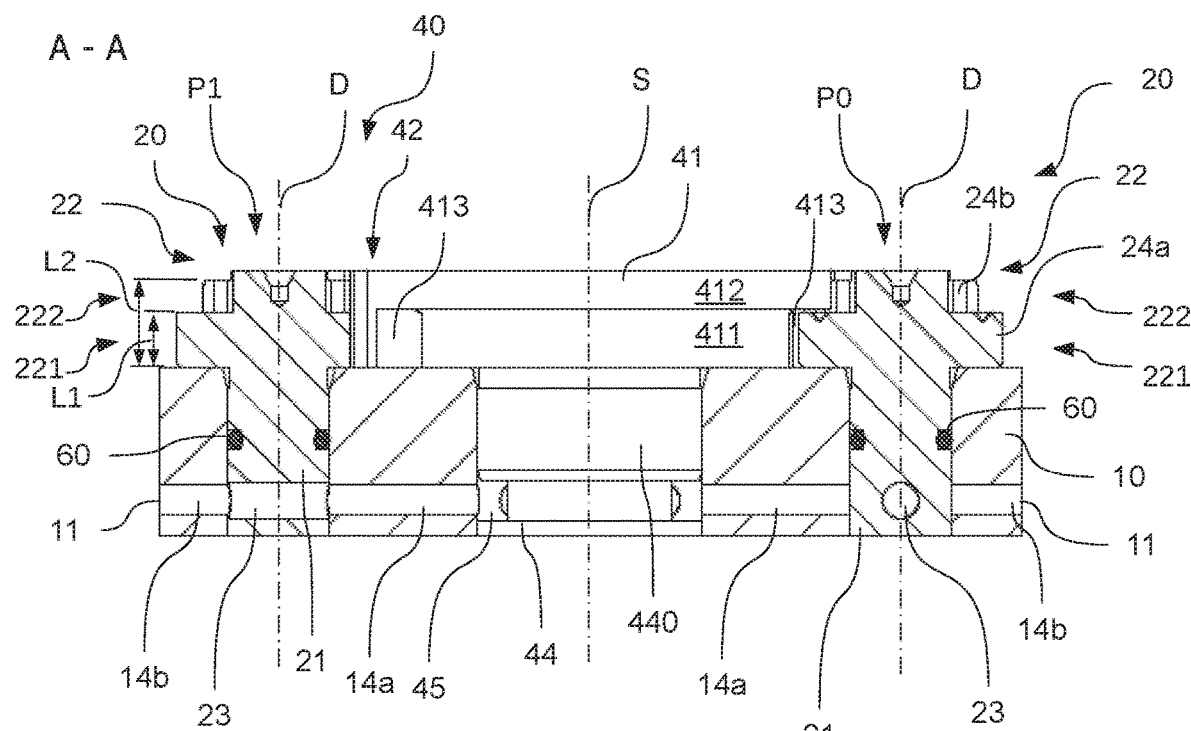
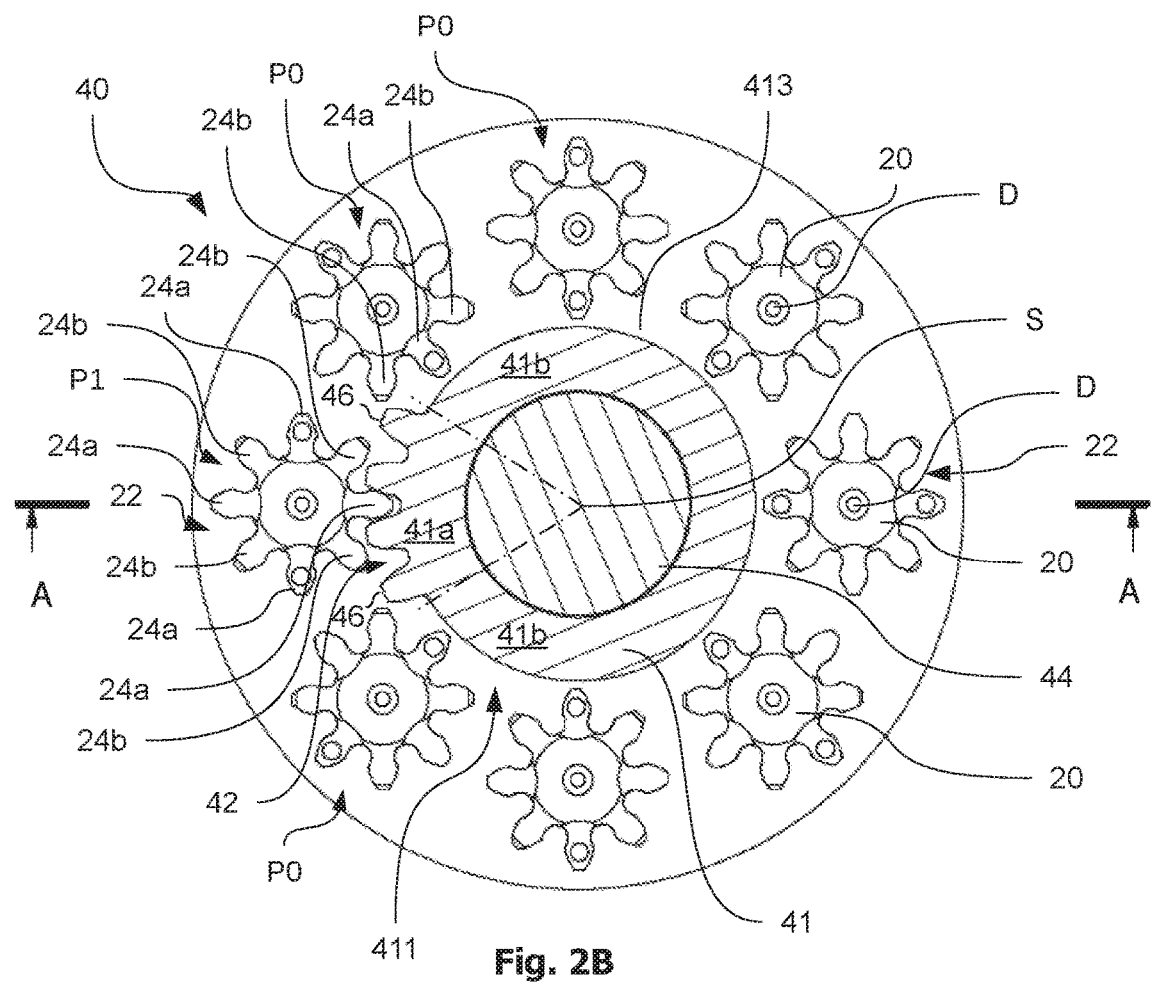
Fig. 2A
Fig. 2B

LUBRICANT DISTRIBUTOR, ESPECIALLY SECTIONAL DISTRIBUTOR

CROSS-REFERENCE TO RELATED APPLICATION

This application claims priority to German Patent Application No. 10 2018 115 873.4 filed Jun. 29, 2018, the disclosure of which is hereby incorporated by reference in its entirety.

BACKGROUND OF THE INVENTION

Field of the Invention

The invention relates to a lubricant distributor, in particular a sectional distributor, a lubricating device, and a method for distributing lubricant to at least one lubrication point.

Description of Related Art

Lubricant distributors are used for the central lubrication of machines in many areas of technology in order to supply a large number of lubrication points with lubricant, such as grease or oil. The lubricant is conveyed from a lubricant reservoir by means of a lubricant pump and distributed through the lubricant distributor to the respective lubrication points.

Progressive distributors are known from the prior art for their relatively precise metering of the lubricant to several lubrication points. Sectional distributors are typically of a simpler design and can ensure a distribution of the lubricant even at low delivery pressures. Sectional distributors are designed for use in lubrication systems in which lubrication points are divided into different sections which differ in each case in the need for lubricant or are at different distances.

From EP 3 272 591 A1 a lubricant distributor for a vehicle system is known which has a large number of individually controllable supply valves in order to supply the lubrication points of various operating components with lubricant in groups. The supply valves are designed as solenoid valves which can be switched between an open and a closed position by energizing an associated solenoid.

Conventional lubricant distributors have the disadvantage that they can either be used with relatively low flexibility or have a comparatively complex design. Particularly the electrical actuation of each individual valve is complex from a constructional standpoint, accordingly error-prone and/or maintenance-intensive and expensive.

Based on this prior art, it is the object of the present invention to provide a lubricant distributor which is simple in design and, in particular, as flexible as possible in use, as well as a method for distributing lubricant to several lubrication points which is easy to implement and, in particular, ensures lubrication in line with requirements.

SUMMARY OF THE INVENTION

This object is solved by a lubricant distributor according to the invention.

In particular, the object is solved by a lubricant distributor, in particular a sectional distributor, for distributing lubricant to at least one lubrication point, comprising:
- a distributor body having an inlet opening for lubricant which is fluidically connected to at least one outlet passage which opens into an outlet opening of the distributor body,
- a rotary valve rotatably supported in the distributor body and adjustable between an open position of the rotary valve in which the outlet passage is opened to allow lubricant to pass to the outlet opening and a closed position of the rotary valve in which the outlet passage is closed,
- a drive, in particular an electromotive drive, coupled to a control gear comprising a control gearwheel having at least one control toothing section engageable with a toothing of the rotary valve to adjust the rotary valve between the open position and the closed position.

One idea of the invention is to mechanically control the distribution of the lubricant to at least one lubrication point or section of a lubrication system by means of a lubricant distributor, preferably driven by an electric motor. In particular, the opening and closing of outlet passages for lubricant is effected purely mechanically by a control gear. The lubricant distributor is particularly suitable for variable control of the lubricant supply of at least one lubrication point or lubrication section. In particular, the lubricant distributor does not include any pump elements assigned to an outlet passage. In particular, lubricant under delivery pressure is supplied to the lubricant distributor via the inlet opening. A sectional distributor can be understood as a lubricant distributor which ensures the distribution of lubricant to different sections of a lubrication system, wherein a section can comprise one or more lubrication points.

The control gear can be understood as a control mechanism which can be rotatably actuated by the drive and which effects an adjustment movement of the at least one rotary valve between a closed position and an open position. The control gear is preferably (centrally) driven by a single drive. The drive can be coupled indirectly to the control gear, in particular via a gear stage (gearwheel drive, belt drive or chain drive), preferably a spur gear or worm gear, or directly, e.g. via a shaft. The control gear is preferably designed as a spur or worm gear, wherein the rotary axes of the rotary valve and the control gear are particularly parallel to each other.

A rotary valve can be understood as a valve that can be moved (switched) from an open position to a closed position and vice versa by a rotary movement. In this respect, an adjustment of the rotary valve can be understood as a twist, wherein the open position and the closed position in particular represent different angular positions of the rotary valve. A rotary valve can preferably be operated rotatably. In particular, in an open position, the rotary valve allows lubricant to flow through the outlet passage (release of the outlet passage), while in a closed position, the rotary valve prevents lubricant from flowing through the outlet passage (blocking of the outlet passage). The rotary valve is designed in particular as a shut-off valve, wherein the outlet passage can run through the rotary valve.

A fluidic connection between the inlet opening and an outlet passage can be understood to mean that lubricant can flow directly or indirectly from the inlet opening into the outlet passage, in particular indirectly via one or more communicating passages (passage system), preferably via a (central) distribution channel. Several inlet openings for lubricant may be provided. The distributor body may be of integral or multi-piece design and, in particular, have a rotationally symmetrical, preferably cylindrical, basic shape.

A lubricant distributor according to the invention has the advantage that it is simply constructed by using rotary valves which can be controlled via a control gear. This achieves mechanical control of the lubricant distribution and eliminates the need for complex electrical control of individual valves in the outlet passages. In addition, the quantity of lubricant allocated to the individual outlet openings can be variably adjusted or controlled, both over time for a specific outlet opening and for different outlet openings of the lubricant distributor.

In an advantageous further development of the invention, the drive features a drive shaft driven by an electric motor with a toothing that meshes with a drive toothing of the control gearwheel. The toothing of the drive shaft can be a drive gear or a drive worm. The drive toothing can be an external toothing or an internal toothing of the control gearwheel. Preferably, the drive wheel and the control gearwheel mesh with each other via a spur toothing. The rotary axes of the drive shaft and the control gearwheel are in particular parallel to each other, preferably parallel to a longitudinal axis of the distributor body. The transmission ratio between the drive and the control gear or control gearwheel is preferably greater than 1.

In an advantageous further development of the invention, several rotary valves are arranged around the control gearwheel, in particular at the same distance from the axis of rotation of the respective rotary valve to an axis of rotation of the control gearwheel. Preferably the rotary valves are evenly distributed in the circumferential direction of the control gearwheel. For example, 2 to 16, preferably 4 to 12, more preferably 6 to 10, particularly preferably 8 rotary valves may be provided, each rotary valve preferably being assigned to an outlet passage. This arrangement allows several rotary valves to mesh simultaneously or successively with the control toothing section of the control gearwheel. This means that a (central) control of several rotary valves can be easily constructed.

In an advantageous further development of the invention, the control gearwheel has at least one toothed sector, over which the control toothing section extends, and at least one toothless sector. The control gearwheel can be understood as a partially toothed gearwheel. A toothed sector extends in particular over part of the circumference of the control gearwheel, i.e. it can represent a partial toothing of the control gearwheel. In particular, the control gearwheel is divided into toothed and toothless sectors. A toothless sector may be formed by an area of the circumferential area of the control gearwheel in which no teeth are formed. Preferably, the toothed sector has an external toothing. In particular, a toothed sector extends over an angular range between 30° and 90°, preferably between 45° and 75°, further preferably between 50° and 70°, particularly preferred by approximately 60°. The control gearwheel may have several toothed sectors separated by toothless sectors. The control toothing section, for example, comprises between 1 and 8, preferably between 2 and 6, more preferably between 3 and 5, particularly preferably 4 control teeth. In particular, the pitch circle diameter of the control gearwheel is larger than the pitch circle diameter of the toothing of the rotary valve. The transmission ratio between the control gearwheel and the rotary valve, for example, is between 1/4 and 1, preferably between 1/3 and 1/2, for example approx. 0.4. In particular, the tip circle of the toothing of the rotary valve does not intersect the circumferential circle of the toothless sector of the control gearwheel. The control gearwheel can engage with the toothing of the rotary valve via the control toothing section during a rotation along the toothed sector, while in the toothless sector no engagement with the toothing of the rotary valve is possible. This results in temporary engagement with the toothing of one or each rotary valve over one revolution of the control gearwheel, wherein the rotary valve is adjusted (twisted) during engagement.

In an advantageous further development of the invention, the toothing of the rotary valve has different axial toothing regions, wherein a first axial toothing region has in particular fewer, preferably half as many, teeth than a second axial toothing region. Axial toothing regions can be directly adjacent or spaced along the rotary axis of the rotary valve. In particular, the first and second axial toothing regions form a stepped toothing of the rotary valve.

In an advantageous further development of the invention, first teeth of a first axial toothing region and second teeth of a second axial toothing region have different tooth lengths, wherein preferably first teeth with a first tooth length and second teeth with a second tooth length are arranged alternately. In particular, the first and second teeth are arranged alternately in the circumferential direction of the rotary valve. The first teeth are preferably shorter than the second teeth, with the first teeth preferably extending along part of the second teeth. Preferably the tooth circles (root and/or tip circles), and in particular the tooth thickness, of first and second teeth are (essentially) the same. In particular, the first and second teeth serve to adjust the rotary valve. Second teeth can secure the rotary valve against (unintentional) rotation, in particular via their (extended) tooth flanks.

In an advantageous further development of the invention, the control gearwheel has a first and a second axial region in the toothless sector, with the first axial region having a circumferential recess. In particular, a circumferential area of the control gearwheel is stepped in the toothless sector, preferably in two stages. Preferably, the circumferential area of the control gearwheel in the first axial region jumps back relative to the tip circle of the control toothing section, wherein the shape of the circumferential recess corresponds in particular to a circular ring segment of the control gearwheel. Preferably, the diameter of the control gearwheel in the first axial region corresponds to the root diameter and in a second axial region to the tip diameter of the control gear section. In particular, the circumferential area of the control gearwheel in the second axial region passes flush into the two end-side control teeth of the control toothing section. Due to the circumferential recess or the set-back portion in the toothless sector, the control gearwheel can turn over the first (shorter) teeth of the rotary valve, i.e. without meshing with the teeth of the rotary valve.

In an advantageous further development of the invention, the first toothing region of the rotary valve toothing extends into the first axial region but not into the second axial region of the control gearwheel and the second toothing region of the rotary valve toothing extends into the first axial region and the second axial region of the control gearwheel. In particular, the tooth length of the first teeth in the first toothing region is shorter than the tooth length of the second teeth in the second toothing region. In this way, the first and second toothing regions can engage the control toothing section in the toothed sector of the control gearwheel, while the second toothing region can cooperate with the circumferential area of the control gearwheel in the toothless sector to provide an anti-rotation device for the rotary valve.

In an advantageous further development of the invention, the circumferential area in the second axial region of the control gearwheel blocks a rotary movement of the rotary valve when the rotary valve is in a closed position, in particular by tooth flanks of the second teeth striking the circumferential area in the second axial region of the control gearwheel during a rotation of the rotary valve. Such an anti-rotation device is easy to implement without additional components. For example, vibrations during operation of the lubricant distributor could cause an unintentional rotation of a rotary valve from the closed position.

In an advantageous further development of the invention, the distributor body has a preferably radial inlet passage which originates from the inlet opening and which is fluidically connected via a preferably central distribution channel to the at least one preferably radial outlet passage. Inlet and outlet passages can be designed in the distributor body, preferably as bores.

In an advantageous further development of the invention, the control gearwheel sits on an axle mounted in the distributor body, which in particular is aligned parallel to an axis of rotation of the rotary valve. The axle is preferably rotatably mounted in the distributor body and/or in a housing cover. In particular, the axle is arranged centrally in (in the middle of) the distributor body, preferably along the longitudinal axis of the distributor body. This results in a symmetrical design of the lubricant distributor. The control gearwheel can be formed integrally or in multiple pieces, for example two-piece, consisting of a drive sprocket that is coupled to the drive and a control sprocket that controls at least one rotary valve. Preferably the control sprocket is firmly connected to the axle. The drive sprocket can be permanently connected to the axle and/or the control ring.

In an advantageous further development of the invention, the distribution channel is designed as an annular channel, in particular as an annular groove in a circumferential area of the axis. Via a (central) distribution channel, lubricant can be distributed from the inlet opening into several outlet passages. This results in a central lubricant distribution via the distribution channel. The axle is preferably sealed in the axial direction against the escape of lubricant by seals (sealing rings).

In an advantageous further development of the invention, the rotary valve comprises a shut-off body, preferably a shut-off cylinder, with a through opening, preferably perpendicular to the axis of rotation. The through opening, in particular, is designed as a bore which, when operated in an open position, can be regarded as a section of the outlet passage. The rotary valve can be designed as a cylinder valve (perforated cylinder as shut-off body) or as a ball valve (perforated ball as shut-off body). The shut-off body and the teeth of the rotary valve can be formed integrally or in multiple pieces. Such a rotary valve has a simple design and requires little maintenance.

In an advantageous further development of the invention, the outlet passage has an inner passage section opening into the distribution channel and an outer passage section, wherein the shut-off body of the rotary valve is disposed between the inner and outer passage sections. In relation to the distributor body, inner and outer passage sections are arranged in particular radially inside and outside, in particular relative to the rotary valve. The outer passage section preferably leads into the outlet opening. In particular, the through opening of the shut-off body in the open position of the rotary valve continues the outlet passage. The inner passage section preferably has a distribution opening which opens into the distribution channel or (radially) leads away from it.

In an advantageous further development of the invention, the control toothing section of the control gearwheel is matched to the toothing, in particular the first axial toothing section, of the rotary valve in such a way that one revolution of the control gearwheel causes the rotary valve to rotate by 180°. This ensures that a rotary valve is moved by the control gearwheel from a closed position (via the open position) back to the closed position when the control gearwheel turns once past the rotary valve. In particular, a rotary valve can only be in the open position if the control toothing section of the control gearwheel meshes with the toothing of the rotary valve. The lubricant distribution can thus be reliably controlled.

In an advantageous further development of the invention, a lubrication time interval during which a rotary valve is in the open position is variably adjustable, especially for several rotary valves in succession. A lubrication time interval can be defined as a period of time during which the lubricant can escape through the outlet passage assigned to a particular rotary valve to lubricate an interface. In particular, the lubricant distribution can be variably adjusted by actuating the drive via the kinematics of the control gear. More precisely, the lubrication time interval can be adjusted by influencing the movement of the control gearwheel. In particular, by temporarily stopping the control gearwheel while it is meshing with the toothing of the rotary valve, the lubrication time interval can be set to any length. This makes it possible to adjust the amount of lubricant that is delivered from the lubricant distributor to a lubrication point per opening of the outlet passage.

In an advantageous further development of the invention, the electric motor is designed as a stepper motor, which is formed so that it can be actuated in particular by a distributor control unit. By means of a stepper motor adapted to the kinematics of the control gear or its coordinated actuation, a time-variable opening of one or more rotary valves can be easily implemented. This allows the distribution of lubricant to be controlled as required.

In an advantageous further development of the invention, between 2 and 16, preferably between 4 and 12, more preferably between 6 and 10, particularly preferably 8, outlet passages are provided, each of which is assigned a rotary valve. This allows a corresponding number of points or lubrication sections to be supplied with lubricant.

In an advantageous further development of the invention, the lubricant distributor comprises a flow sensor which is fluidically connected to the inlet opening, in particular for detecting a lubricant flow in the outlet passage. The flow sensor is preferably designed as an oval wheel meter or piston meter, for example as a piston meter in progressive piston design. The flow sensor (flow meter) can be located upstream or downstream of the inlet opening. In particular, the flow sensor with the inlet opening is connected in fluid communication to the distributor body, preferably screwed on, or arranged in the inlet passage, i.e. in particular inside the distributor body. The flow sensor can be connected (in a signal-conducting manner) to a (central) control unit of the lubricant distributor (distributor control unit) or a lubrication device. A (central) flow sensor which is assigned to the inlet orifice or is fluidically connected to it enables the measurement or monitoring of the lubricant quantity distributed through the respectively opened outlet passage easily, especially with a single flow sensor.

In an advantageous further development of the invention, the lubricant distributor comprises a position detection device for detecting the position of the control gear, wherein the position detection device comprises in particular a position sensor and an exciter element which rotates with the control gearwheel. The position sensor is preferably designed as a Hall sensor (Hall switch) or reed switch. The position detection device is in particular designed to determine the position of the rotary valves based on a detection of the position of the control gearwheel and preferably based on a speed of the drive motor. Preferably, the exciter element is firmly connected to the control gearwheel, preferably on one end face of the control gearwheel. The exciter element has a soft magnetic (ferromagnetic) material, in particular a metal. The position sensor is arranged in particular in such a way that it detects a movement, in particular a passage, of the exciter element which is based in particular on a rotary movement of the control gearwheel. Preferably, the position sensor detects a disturbance of a magnetic field by the exciter element. The position sensor can be connected (in a signal-conducting manner) to a (central) distributor control unit or a control unit of a lubricant device. In particular, the exciter element defines a passage position (zero position) of the control gearwheel for each revolution of the control gearwheel. In particular, a (momentary) position of the control gearwheel can be determined from this detected passage position on the basis of a detected or determined speed of the drive motor. Based on the known kinematics of the control gearwheel, i.e. the coupled movements of the control gearwheel and the rotary valves, the (momentary) position of each rotary valve (open position or closed position) can be determined. In particular, it is possible to determine which rotary valve is currently open, i.e. through which outlet passage or distribution connection lubricant flows.

The said object is also solved in particular by a lubrication device comprising a lubricant distributor according to the invention and a lubricant pump which is connected to the inlet opening of the lubricant distributor in order to provide lubricant, in particular lubricant which is subjected to a delivery pressure.

The said object is also solved in particular by a method for distributing lubricant to at least one lubrication point by a lubricant distributor which has at least one rotary valve rotatably mounted in a distributor body for opening and closing an outlet passage of the distributor body for lubricant, wherein a drive of the lubricant distributor, in particular an electromotive drive, is coupled to a control gear for adjusting the rotary valve, in particular by a lubricant distributor according to the invention or a lubrication device according to the invention, comprising the following steps:
   a) Adjusting the rotary valve from a closed position, in which the outlet passage is closed, to an open position, in which the outlet passage is open, by actuating the drive;
   b) Setting, preferably variable, a lubrication time interval by actuating the drive, wherein the rotary valve is in the open position during the lubrication time interval;
   c) Adjusting the rotary valve from the open position to the closed position by actuating the drive.

The drive can be actuated by a distributor control unit of the lubricant distributor, wherein in particular an electric motor of the drive is supplied with a corresponding input signal. In particular, the actuation of the drive causes the control gear to be actuated, wherein the rotary valves are adjusted by turning the control gearwheel. In particular, the drive is designed as a central (rotary) drive for the lubricant distributor. In particular, the lubricant distribution can be variably adjusted by actuating the drive via the kinematics of the control gear.

The method can also implement some or all of the process-related features described in connection with the lubricant distributor. It has similar advantages to those already described in connection with the lubricant distributor according to the invention.

In an advantageous further development of the method according to the invention, one or more rotary valves are opened and closed one after the other by repeating steps a) to c), wherein the lubrication time interval is set differently in each case. In particular, a time-adjusted actuation of the drive allows a rotary valve to be held in the open position for as long as required if the control gearwheel meshes with the teeth of the rotary valve. In particular, lubrication time intervals for different outlet openings of the lubricant distributor (lubricant outlets) can be selected or set independently of each other.

BRIEF DESCRIPTION OF THE DRAWINGS

Embodiment examples of the invention are described below which are explained in more detail using the drawings, wherein:
FIG. 2A shows parts of the lubricant distributor according to FIG. 1 in a longitudinal sectional view along the section line A-A in FIG. 2B;
FIG. 2B shows parts of the lubricant distributor according to FIG. 2A in a cross-sectional view through the first axial region of the control gearwheel.

DESCRIPTION OF THE INVENTION

Figure 1:
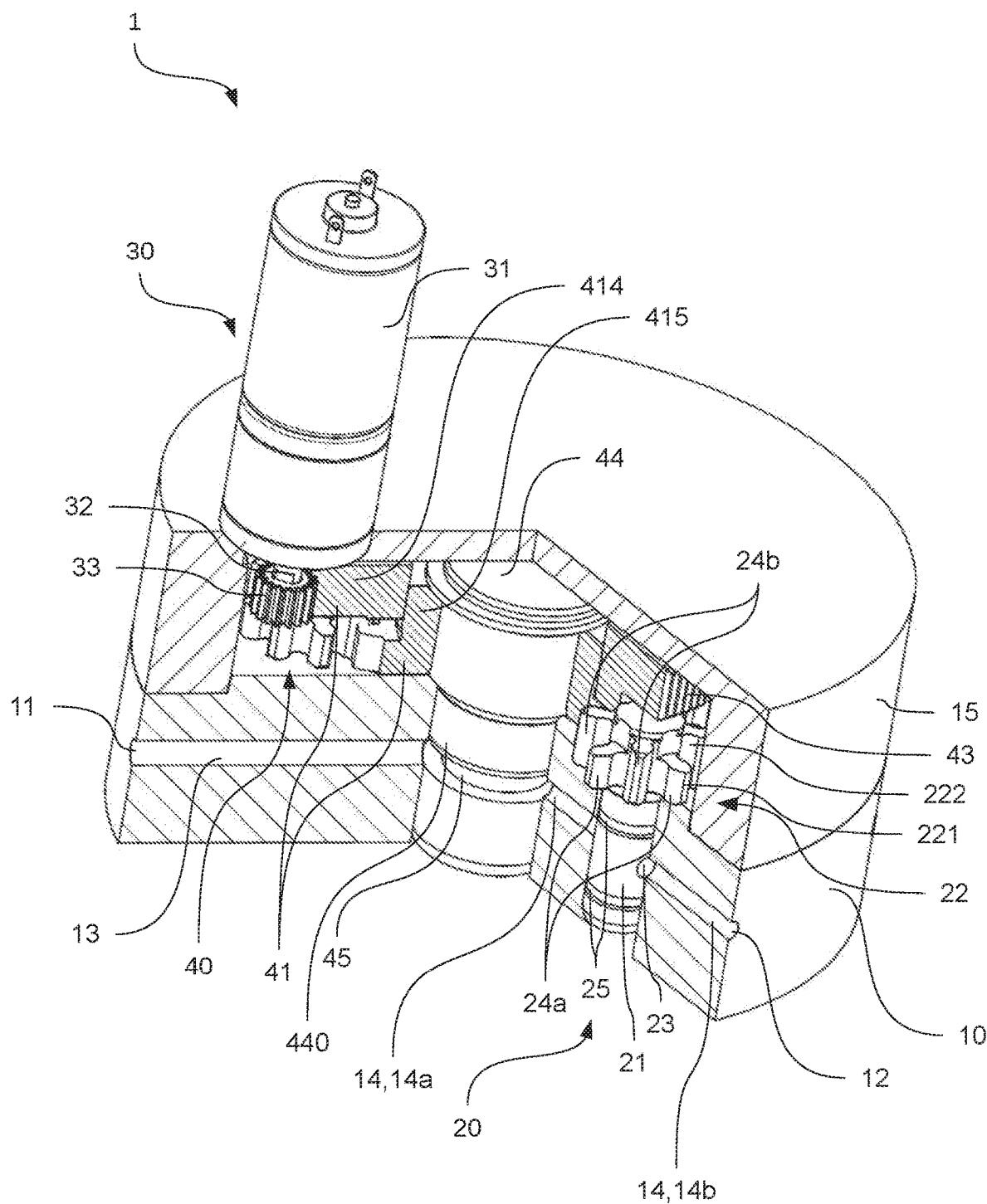
FIG. 1 shows an embodiment of a lubricant distributor according to the invention in a perspective sectional view.
Figure 3A:
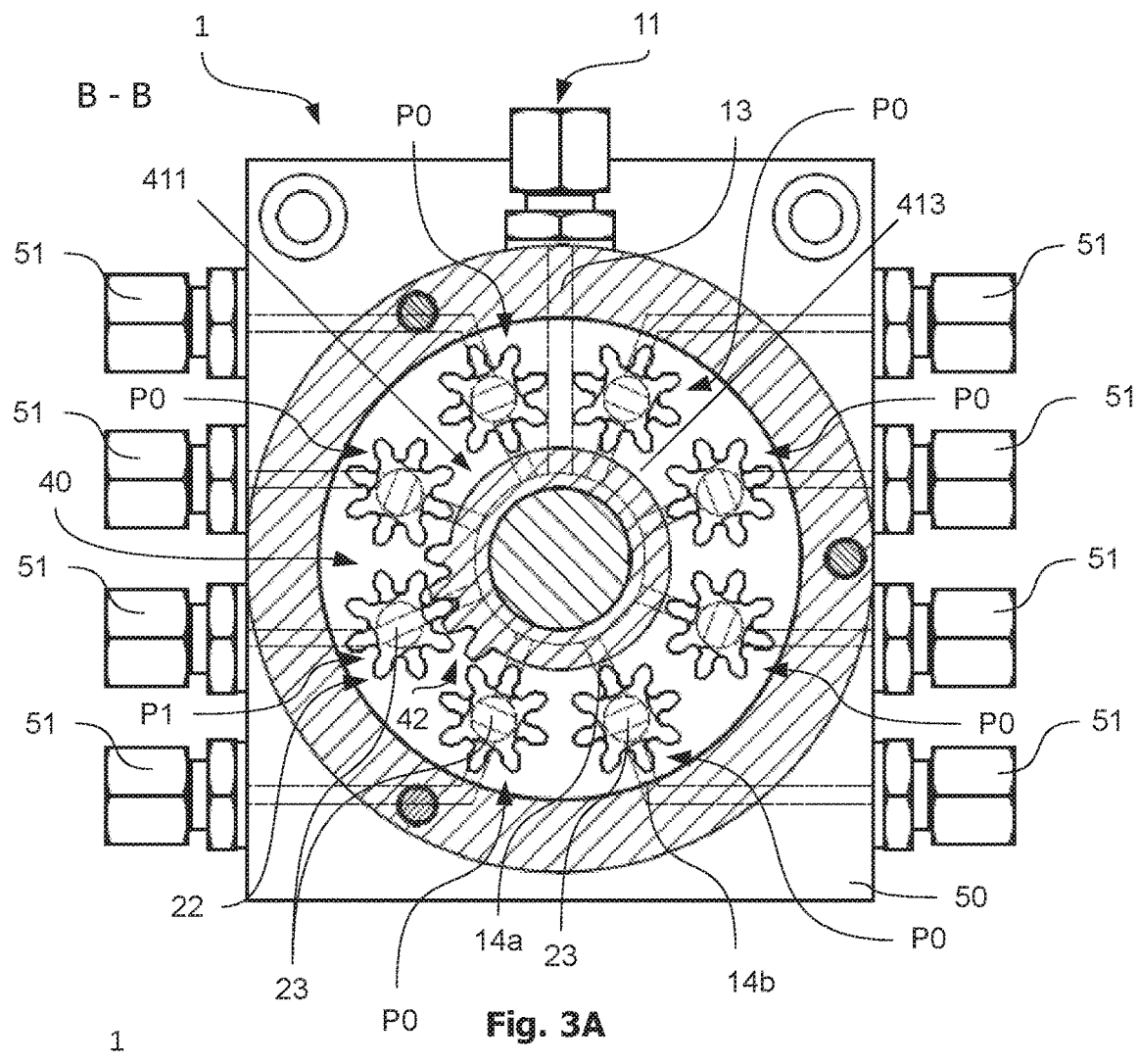
FIG. 3A shows an embodiment of a lubricant distributor according to the invention in a cross-sectional view along the section line B-B in FIG. 3B.
Figure 3B:
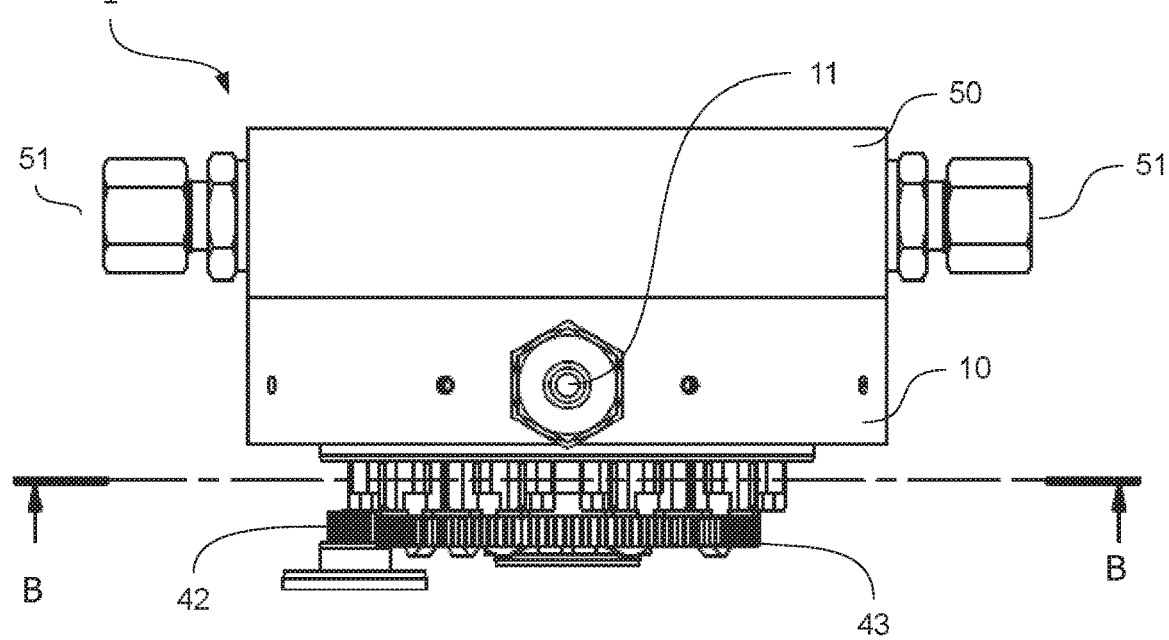
FIG. 3B shows the lubricant distributor according to FIG. 3A in a side view.
Figure 4A:
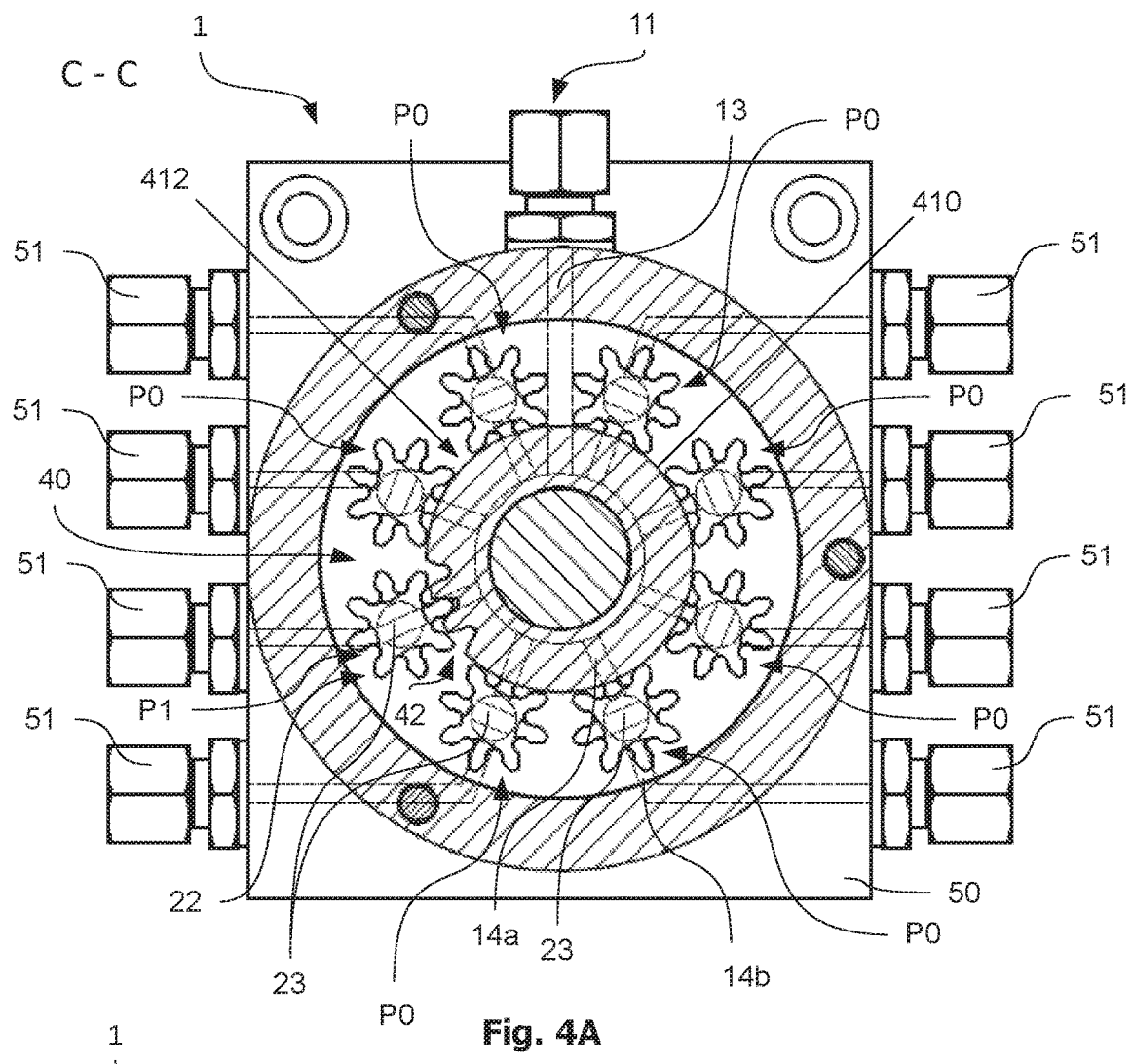
FIG. 4A shows the lubricant distributor according to FIGS. 3A and 3B in a cross-sectional view along the section line C-C in FIG. 4B.
Figure 4B:
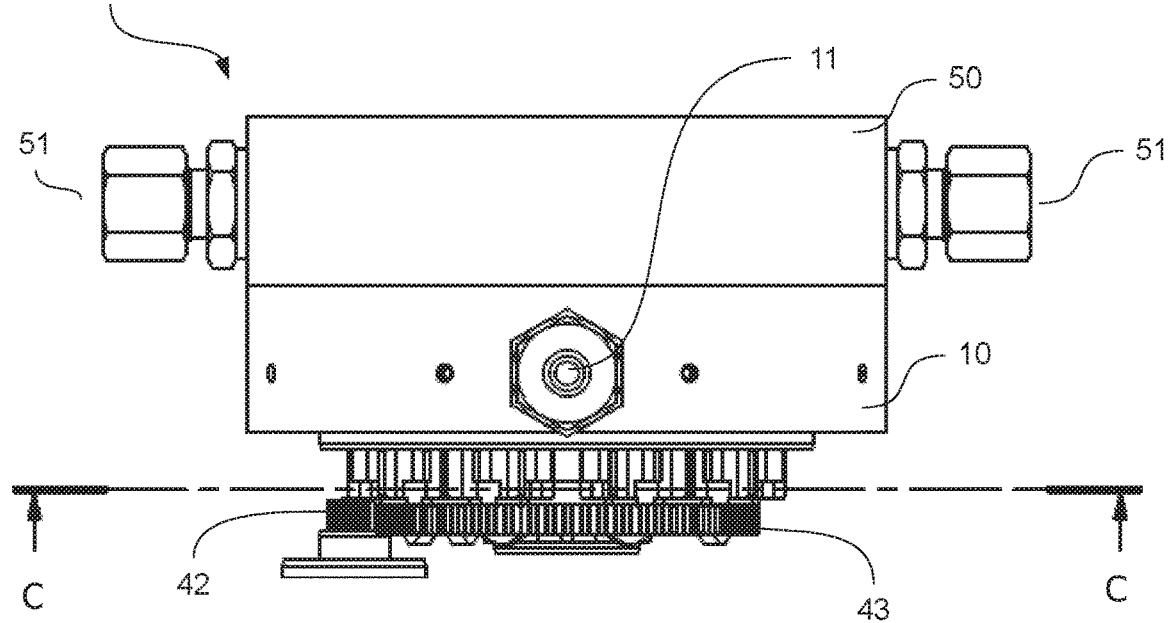
FIG. 4B shows the lubricant distributor according to FIG. 4A in a side view.

In the following description of the invention, the same reference numerals are used for identical and identically acting elements.

FIG. 1 shows a lubricant distributor 1, or a sectional distributor, which has a distributor body 10, preferably made of a metallic material, having an inlet opening 11, and a plurality of outlet openings 12 for lubricant. A housing cover 15 is mounted on the distributor body 10, both of which have a cylindrical basic shape. Through inlet opening 11, lubricant supplied by a lubricant pump at a delivery pressure is introduced into inlet passage 13, from where the lubricant is distributed through distribution channel 45 to the various star-shaped outlet passages 14, which open into the respective outlet openings 12. Distribution channel 45 is designed as an annular groove in the circumferential area 440 of axle 44. Lubricant lines for supplying lubrication points or lubrication sections can be connected to the outlet opening 12 via distribution connections 51 (not shown). Each outlet passage 14 is assigned a rotary valve 20, which is mounted in the distributor body 10 so that it can rotate about an axis of rotation D. The rotary valve 20 is mounted in the distributor body 10 so that it can be rotated about an axis of rotation D. The rotary valves 20 have a shut-off body 21, which divides the outlet passage 14 into an inner passage section 14a and an outer passage section 14b. The shut-off body 21 has a through opening 23 which is formed as a through-bore and continues the outlet passage 14 if it is aligned in the direction of the outlet passage 14, here radially to the distributor body 10. Seals 60 (see FIG. 2A) are used in sealing grooves 25 to axially seal the rotary valves 20. FIG. 1 shows the illustrated rotary valve 20 in an open position P1, where lubricant can escape from the lubricant distributor 1 through the outlet passage 14 and the through opening 23.

The lubricant distributor 1 is driven by the drive 30, which comprises an electric motor 31, in particular a stepper motor, via a drive shaft 32, which is connected to a toothing 33, in this case a drive gearwheel. A control gear 40 comprises a control gearwheel 41 and the rotary valves 20 with their toothing 22. The control gearwheel 41 is driven by the drive gearwheel 33. The control gearwheel 41 is designed in two parts and consists of a drive sprocket 414 with a drive toothing 43 designed as external toothing, with which the drive gearwheel 33 meshes, and a control sprocket 415, which forms the control toothing section 42. The control gearwheel 41 is fixed on an axle 44, which is centrally mounted in the distributor body 10 so that it can be rotated about an axis of rotation S. The rotary valves 20 have a toothing 22, which can be intermittently meshed with a toothing section 42 of the control gearwheel 41.

FIGS. 2A and 2B show how lubricant distributor 1 works. A total of eight rotary valves 20 are arranged at equal intervals circumferentially around the control gearwheel 41. The control gearwheel 41 has a toothed sector 41a, which here extends over an angular range of approximately 60°, and a toothless sector 41b. In the toothed sector 41a, the control gearwheel 41 forms a control toothing section 42 comprising four control teeth 46. In the toothless sector 41b, a circumferential recess 413 is provided instead of a toothing, the circumferential line of which corresponds to the root circle of the control teeth 46. In this respect, the control gearwheel 41 is partially toothed. Several control toothing sections 42 distributed over the circumference could be provided. The rotary valves 20 are arranged radially at a distance from the control gearwheel 41 so that the toothing 22, consisting of the teeth 24a, 25b, can engage with the control toothing section 42. Teeth 24a, 25b do not touch control gearwheel 41 in toothless sector 41b. When the control gearwheel 41 is rotated the control toothing section 42 meshes successively with the toothing 22 of the respective rotary valve 20. This allows the rotary valves 20 to be adjusted or controlled via the control gearwheel 41. The rotary valves 20 are adjustable between an open position P1 and a closed position P0. In the embodiment shown, each rotary valve 20 rotates 180° around the axis of rotation D during one revolution of the control gearwheel 41. This brings a valve 20 from an initial closed position P0 via an open position P1 back to a closed position P0.

By controlling the rotary motion of the control gearwheel 41, a lubrication time interval can be set variably and independently for each rotary valve 20 or each associated outlet passage 14. Preferably, the drive 30 is actuated in such a way that the control gearwheel 41 continues to rotate by a predetermined angle. The control gearwheel 41 is stopped in the open position P1 of the currently engaged rotary valve 20 for as long as a flow of lubricant through the outlet passage 14 is to be permitted to provide a desired amount of lubricant to a lubrication point. In principle, a continuous rotation of the control gearwheel 41 is also conceivable, optionally with a temporary deceleration or acceleration of the rotational speed. A change of direction of the control gearwheel 41 can also be provided in principle in order to achieve a certain lubricant distribution, for example in order to not actuate individual adjacent rotary valves 20.

The toothing 22 of a rotary valve 20 has the first axial toothing region 221 with first teeth 24a and a second axial toothing region 222 with second teeth 24b. First and second teeth 24a, 24b have different tooth lengths L1, L2. First teeth 24a of the first tooth length L1 extend over a part of the larger second tooth length L2 of the second teeth 24b. In this respect, the toothing 22 is graduated, namely two-stage. Of a total of eight teeth 24a, 24b, four first teeth 24a and four second teeth 24b are arranged alternately in the circumferential direction of the rotary valve 20. The two-stage toothing 22 in conjunction with the control gearwheel 41 described below (see FIGS. 3A to 4B) prevents the rotary valves 20 from twisting unintentionally, which could occur, for example, due to vibrations of the lubricant distributor 1 during operation.

A comparison of FIGS. 3A, 3B and 4A, 4B shows that the control gearwheel 41 has a first axial region 411 (see FIGS. 3A and 3B), a second axial region 412 (see FIGS. 4A and 4B), wherein the control gearwheel 41 has a circumferential recess 413 in the form of a circular ring segment in the toothless sector 41b. The circumferential area 440 is graded in the toothless sector 41b. In the first axial region 411, the circumferential area 440 springs back from the second axial region 412. Conversely, the second axial region 412 protrudes from the first axial region 411. As a result, the tooth flanks of the second, longer teeth 24b in the closed position P0 of a rotary valve 20 strike the circumferential area 440 in the second axial region 412 of the control gearwheel 41 already at a minimum twist (see FIG. 4A). This blocks significant rotation of the rotary valve 20 while the control gearwheel 41 rotates past the rotary valve 20, but without engaging with it. The control gearwheel 41 can turn over the first, shorter teeth 24a in that the control gearwheel 41 jumps back in the first axial region 411 or forms the circumferential recess 413, while the second teeth 24b prevent an unintentional adjustment of the rotary valves 20 in the closed position P0.

In the embodiment according to FIGS. 3A to 4B, the lubricant distributor 1 is connected to a connecting plate 50 with a total of eight distribution connections 51. Outlet passages between the distributor body 10 and the distribution connections 51 are illustrated with dashed lines, wherein corresponding axial connecting passage sections connect the distributor body 10 to the connecting plate 50. Three centering pins are shown in a sectional view. The lubricant distributor 1 according to FIGS. 3A to 4B functions in the same way as the embodiment shown in FIGS. 1 to 2B.

In the method according to the invention, drive 30 is actuated or operated to turn a rotary valve 20 from the closed position P0 to the open position P1. For example, actuation occurs by a distributor control unit which is connected to the lubricant distributor or drive 30. A lubrication time interval of the respective rotary valve 20 is then set or suitably selected by stopping the control gearwheel 41 for as long as a lubricant flow through the outlet passage 14 is desired for the allocation of a desired quantity of lubricant to a lubrication point. Drive 30 is then actuated or operated again to move this rotary valve 20 from the open position P1 to the closed position P0. This procedure is repeated in turn for each rotary valve 20, wherein the lubrication time intervals can be set differently in each case and, in particular, variably per revolution of the control gearwheel 41.

Figure 5:
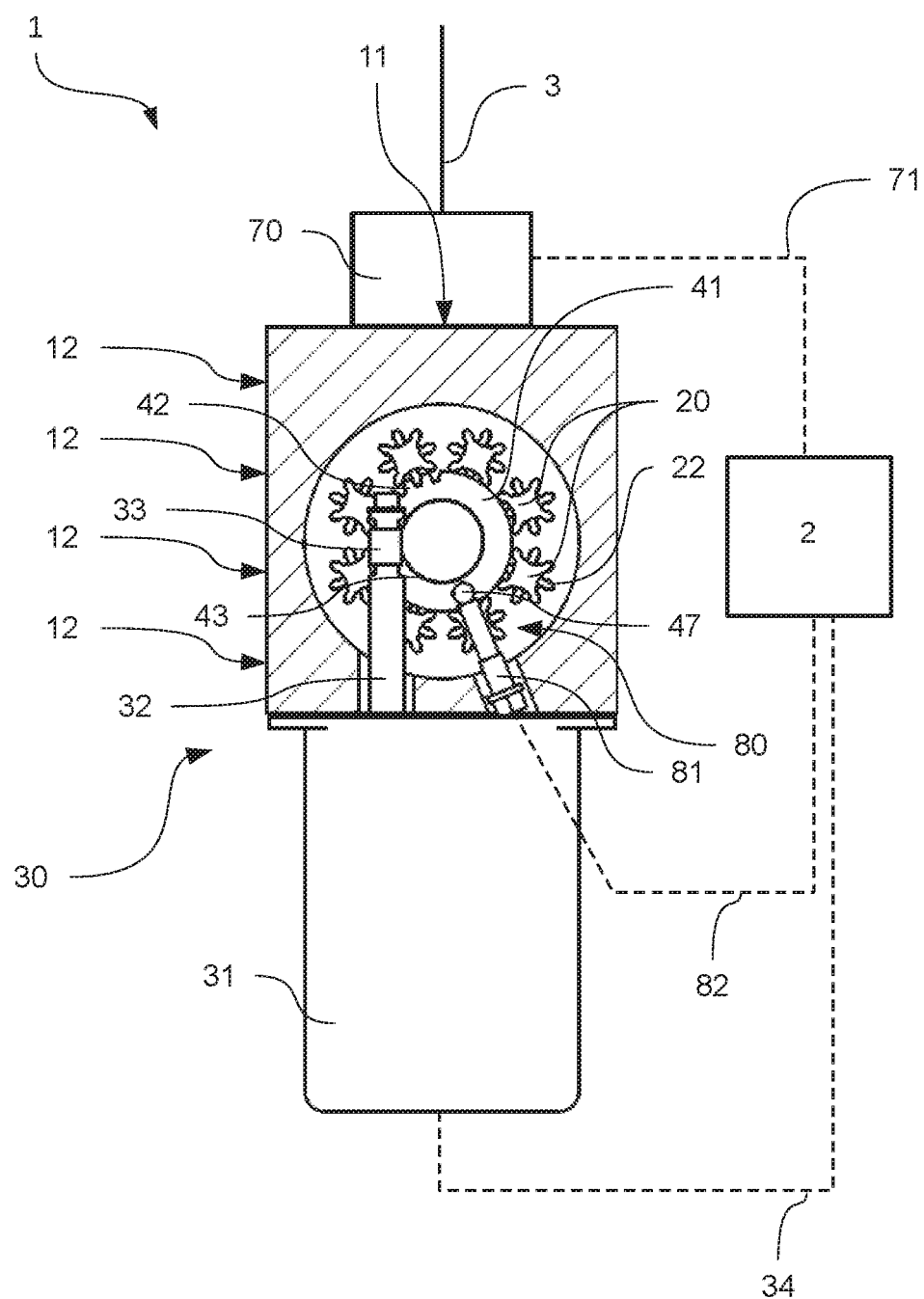
FIG. 5 shows an embodiment of a lubricant distributor according to the invention in a cross-sectional view.

FIG. 5 shows an embodiment of a lubricant distributor 1 according to the invention with a flow sensor 70 and a position detection device 80, which otherwise functions in the same way as the embodiments described above. The toothing 33 of the drive shaft 32 is designed as a drive worm. The drive shaft 32 in this embodiment extends perpendicularly to the axis of rotation S of the control gearwheel 41.

The flow sensor 70 is arranged between a lubricant supply line 3 and the distributor body 10 in such a way that it is fluidically connected to the inlet opening 11. The flow sensor is connected to the central distributor control unit 2 via a signal line 71. The position detection device 80 comprises an exciter element 47 and a position sensor 81, which here is designed as a reed switch (reed contact) and is connected to the distribution control unit 2 via signal line 82. The position sensor 81 could also be designed as a Hall sensor or Hall switch (Hall contact). The exciter element 47 is made of a soft magnetic material, e.g. metal, and is firmly connected to the control gearwheel 41, e.g. screwed in. With each rotation of the control gearwheel 41, the co-rotating exciter element 47 passes the position sensor 81 and generates a sensor signal, in particular by disturbing the magnetic field of the position sensor 81. The distributor control unit 2 is also connected to the drive 30 or the drive motor 31, in particular to measure the speed of the drive motor 31. Based on the detected passage position or zero position of the control gearwheel 41 via the exciter element 47 and based on a transmitted speed of the drive motor 31, the distributor control unit 2 can determine or calculate the current position of the rotary valves 20. The distributor control unit 2 comprises a processor or microcontroller and performs a signal evaluation. The position detection device 80 enables the determination of the currently opened rotary valve 20 or via which of the distribution connections 51 the lubricant is currently distributed.

A lubricant distributor 1 in accordance with the invention and a corresponding method have the advantage that they are easy to set up and carry out.

LIST OF REFERENCE NUMERALS

1 Lubricant distributor
2 Distributor control unit
3 Lubricant supply line
10 Distributor body
11 Inlet opening
12 Outlet opening
13 Inlet passage
14 Outlet passage
14a Inner passage section
14b Outer passage section
15 Housing cover
20 Rotary valve
21 Shut-off body
22 Toothing
221 First axial toothing region
222 Second axial toothing region
23 Through opening
24a First teeth
24b Second teeth
25 Sealing groove
30 Drive
31 Electric motor, in particular stepping motor
32 Drive shaft
33 Drive gearwheel
34 Signal line
40 Control gear
41 Control gearwheel
41a Toothed sector
41b Toothless sector
42 Control toothing section
43 Drive toothing
44 Axle
440 Circumferential area of the axle
45 Distribution channel, in particular annular groove
46 Control tooth
47 Exciter element
410 Circumferential area of the control gearwheel
411 First axial region
412 Second axial region
413 Circumferential recess
414 Drive sprocket
415 Control sprocket
50 Connecting plate
51 Distribution connection
60 Seal
70 Flow sensor
71 Signal line
80 Position detection device
81 Position sensor
82 Signal line
100 Lubricating device
P0 Closed position
P1 Open position
D Axis of rotation of the rotary valve
S Axis of rotation of the control gearwheel
L1 First tooth length
L2 Second tooth length

The invention claimed is:

1. A lubricant distributor for distributing lubricant to at least one lubrication point, comprising:
a distributor body having an inlet opening for lubricant which is fluidic ally connected to at least one outlet passage which opens into an outlet opening of the distributor body,
a rotary valve rotatably mounted in the distributor body and adjustable between an open position of the rotary valve in which the at least one outlet passage is open to allow lubricant to pass to the at least one outlet opening and a closed position of the rotary valve in which the at least one outlet passage is closed,
a drive coupled to a control gear comprising a control gearwheel having at least one control toothing section engageable with a toothing of the rotary valve to adjust the rotary valve between the open position and the closed position,
wherein the first toothing region of the toothing of the rotary valve extends into the first axial region but not into the second axial region of the control gearwheel and the second toothing region of the toothing of the rotary valve extends into the first axial region and the second axial region of the control gearwheel.

2. The lubricant distributor according to claim 1,
wherein the drive comprises a drive shaft driven by an electric motor and having a toothing that meshes with a drive toothing of the control gearwheel.

3. The lubricant distributor according to claim 1,
wherein
a plurality of rotary valves are arranged around the control gearwheel at the same distance from the axis of rotation of the respective rotary valve to an axis of rotation of the control gearwheel.

4. The lubricant distributor according to claim 1,
wherein the control gearwheel comprises at least one toothed sector over which a control gear section extends and at least one toothless sector.

5. The lubricant distributor according to claim 1,
wherein the toothing of the rotary valve has different axial toothing regions, wherein a first axial toothing region has fewer teeth than a second axial toothing region.

6. The lubricant distributor according to claim 1,
wherein
first teeth of a first axial toothing region and second teeth of a second axial toothing region have different tooth lengths, wherein the first teeth having a first tooth length and second teeth having a second tooth length are arranged alternately.

7. The lubricant distributor according to claim 1,
wherein the control gearwheel comprises a toothless sector, having a first and a second axial region, wherein the first axial region has a circumferential recess.

8. The lubricant distributor according to claim 1,
wherein a circumferential area in the second axial region of the control gearwheel blocks a rotary movement of the rotary valve when the rotary valve is in a closed position by tooth flanks of teeth striking against the circumferential area in the second axial region of the control gearwheel during a rotation of the rotary valve.

9. The lubricant distributor according to claim 1,
wherein the distributor body has a radial inlet channel which originates from the inlet opening and is fluidically connected to the at least one radial outlet passage via a preferably central distribution channel.

10. The lubricant distributor according to claim 1,
wherein the control gearwheel is seated on an axle which is mounted in the distributor body and is aligned parallel to an axis of rotation of the rotary valve.

11. The lubricant distributor according to claim 10,
wherein a distribution channel is formed as an annular channel in a circumferential area of the axle.

12. The lubricant distributor according to claim 1,
wherein the rotary valve comprises a shut-off body, having a through opening preferably perpendicular to the axis of rotation.

13. The lubricant distributor according to claim 1,
wherein the outlet passage comprises an inner passage section opening into a distribution channel and an outer passage section, wherein a shut-off body of the rotary valve is arranged between the inner and outer passage sections.

14. The lubricant distributor according to claim 1,
wherein the at least one control toothing section of the control gearwheel is matched to a first axial toothing section, of the rotary valve such that one revolution of the control gearwheel causes the rotary valve to rotate by 180°.

15. The lubricant distributor according to claim 1, wherein
a lubrication time interval during which a plurality of rotary valves in succession are in the open position is variably adjustable.

16. The lubricant distributor according to claim 1,
wherein the electric motor is designed as a stepper motor, which is in particular designed to be controllable by a distributor control unit.

17. The lubricant distributor according to claim 1,
wherein between 2 and 16 outlet passages are provided, each of which is assigned a rotary valve.

18. The lubricant distributor according to claim 1,
wherein the lubricant distributor comprises a flow sensor which is fluidically connected to the inlet opening for detecting a lubricant flow in the at least one outlet passage.

19. The lubricant distributor according to claim 1,
wherein the lubricant distributor comprises a position detection device for detecting the position of the control gear, wherein the position detection device comprises a position sensor, which is designed as a Hall sensor or reed switch, and an exciter element which co-rotates with the control gearwheel.

20. A lubricating device comprising a lubricant distributor according to claim 1 and a lubricant pump which is connected to the inlet opening of the lubricant distributor in order to provide lubricant which is subjected to a delivery pressure.

21. A method for distributing lubricant to at least one lubrication point by a lubricant distributor which has at least one rotary valve rotatably mounted in a distributor body for opening and closing an outlet passage of the distributor body for lubricant and a distributor body having an inlet opening for lubricant which is fluidically connected to at least one outlet passage which opens into an outlet opening of the distributor body,
  a rotary valve rotatably mounted in the distributor body and adjustable between an open position of the rotary valve in which the at least one outlet passage is open to allow lubricant to pass to the at least one outlet opening and a closed position of the rotary valve in which the at least one outlet passage is closed, and
  a drive, in particular an electromotive drive, coupled to a control gear comprising a control gearwheel having at least one control toothing section engageable with a toothing of the rotary valve to adjust the rotary valve between the open position and the closed position,
  wherein the first toothing region of the toothing of the rotary valve extends into the first axial region but not into the second axial region of the control gearwheel and the second toothing region of the toothing of the rotary valve extends into the first axial region and the second axial region of the control gearwheel, wherein an electromotive drive of the lubricant distributor is coupled to a control gear for adjusting the rotary valve, by a lubricant distributor or a lubricating device, comprising the following steps:
  a) adjusting the rotary valve from a closed position, in which the outlet passage is closed, into an open position, in which the outlet passage is open, by actuating the drive,
  b) setting a lubrication time interval by actuating the drive, wherein the rotary valve is in the open position during a lubrication time interval,
  c) adjusting the rotary valve from the open position to the closed position by actuating the drive.

22. The method according to claim 21,
wherein one or more rotary valves are opened and closed successively by repeating steps a) to c), the lubrication time interval being set differently in each case.

23. A lubricant distributor, for distributing lubricant to at least one lubrication point, comprising:
  a distributor body having an inlet opening for lubricant which is fluidic ally connected to at least one outlet passage which opens into an outlet opening of the distributor body,
  a rotary valve rotatably mounted in the distributor body and adjustable between an open position of the rotary valve in which the at least one outlet passage is open to allow lubricant to pass to the at least one outlet opening and a closed position of the rotary valve in which the at least one outlet passage is closed, and
  a drive, in particular an electromotive drive, coupled to a control gear comprising a control gearwheel having at least one control toothing section engageable with a toothing of the rotary valve to adjust the rotary valve between the open position and the closed position,
  wherein the first toothing region of the toothing of the rotary valve extends into the first axial region but not into the second axial region of the control gearwheel and the second toothing region of the toothing of the rotary valve extends into the first axial region and the second axial region of the control gearwheel.

* * * * *